United States Patent
Okada

(10) Patent No.: US 7,421,132 B2
(45) Date of Patent: Sep. 2, 2008

(54) IMAGE COMPRESSOR FOR GENERATING PREDICTED DIFFERENCE CODE HAVING FIXED BIT LENGTH BY REQUANTIZING WITH COARSER QUANTIZATION STEPS

(75) Inventor: Sadami Okada, Tokyo (JP)

(73) Assignee: Nikon Corporation, Tokyo (JP)

( * ) Notice: Subject to any disclaimer, the term of this patent is extended or adjusted under 35 U.S.C. 154(b) by 701 days.

(21) Appl. No.: 11/003,372

(22) Filed: Dec. 6, 2004

(65) Prior Publication Data

US 2005/0141772 A1    Jun. 30, 2005

(30) Foreign Application Priority Data

Dec. 25, 2003    (JP)    ............................. 2003-430926

(51) Int. Cl.
*G06K 9/36* (2006.01)
*G06K 9/46* (2006.01)

(52) U.S. Cl. ....................... 382/238; 382/233; 382/246; 382/251

(58) Field of Classification Search ................. 382/232, 382/233, 238, 246, 251
See application file for complete search history.

(56) References Cited

U.S. PATENT DOCUMENTS 5,341,442 A * 8/1994 Barrett ........................ 382/166
5,379,757 A * 1/1995 Hiyama et al. ............... 600/109
6,694,061 B1 * 2/2004 Acharya ...................... 382/251

FOREIGN PATENT DOCUMENTS

JP    2003-224868    8/2003

OTHER PUBLICATIONS

Journal of "Interface"; No. 175, pp. 167-168; Dec. 1991.

* cited by examiner

*Primary Examiner*—Phuoc Tran
(74) *Attorney, Agent, or Firm*—Oliff & Berridge, PLC

(57) ABSTRACT

An image compressor of the present invention includes a difference calculating unit and a difference requantizing unit. The difference calculating unit calculates a predicted difference between a pixel value of image data and a predicted value (a calculated value of the pixel value predicted from known data). When a magnitude of the predicted difference exceeds a predefined threshold value, the difference requantizing unit applies the coarse quantization steps to requantize the predicted difference to keep a bit range to predetermined size. In this manner, compressed data, in which a bit length of the predicted difference for one pixel is adjusted to a fixed bit length, is generated.

10 Claims, 10 Drawing Sheets

FIG. 4

REQUANTIZATION OF FIXED BIT LENGTH OF 8 BITS

| PREDICTED DIFFERENCE S | CATEGORY NUMBER | BIT LENGTH OF CATEGORY CODE | QUANTIZATION STEP | BIT LENGTH OF DIFFERENCE VALUE CODE | BIT LENGTH OF PREDICTED DIFFERENCE FOR EACH PIXEL | QUANTIZATION ERROR |
|---|---|---|---|---|---|---|
| 0 | No. 0 | 8bit | 1 | 0bit | 8bit | 1 |
| −1, 1 | No. 1 | 7bit | 1 | 1bit | 8bit | 1 |
| −3, −2, 2, 3 | No. 2 | 6bit | 1 | 2bit | 8bit | 1 |
| −7··−4, 4··7 | No. 3 | 5bit | 1 | 3bit | 8bit | 1 |
| −15··−8, 8··15 | No. 4 | 4bit | 1 | 4bit | 8bit | 1 |
| −31··−16, 16··31 | No. 5 | 3bit | 1 | 5bit | 8bit | 1 |
| −63··−32, 32··63 | No. 6 | 3bit | 2 | 5bit | 8bit | 30 |
| −127··−64, 64··127 | No. 7 | 3bit | 4 | 5bit | 8bit | 60 |
| −255··−128, 128··255 | No. 8 | 3bit | 8 | 5bit | 8bit | 120 |
| −511··−256, 256··511 | No. 9 | 2bit | 8 | 6bit | 8bit | 120 |
| −682··−512, 512··682 | No. 10 | 3bit | 32 | 5bit | 8bit | 480 |

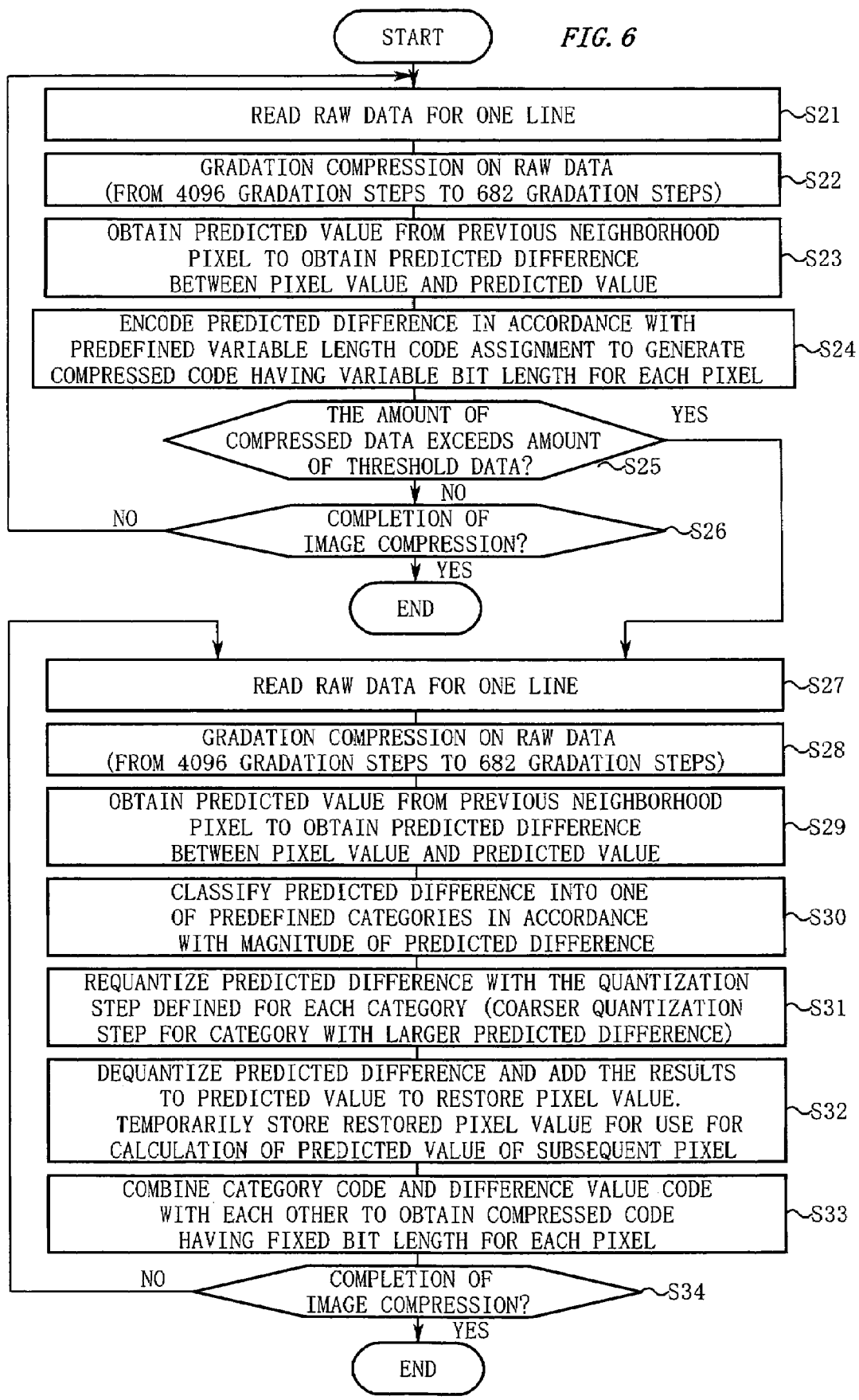

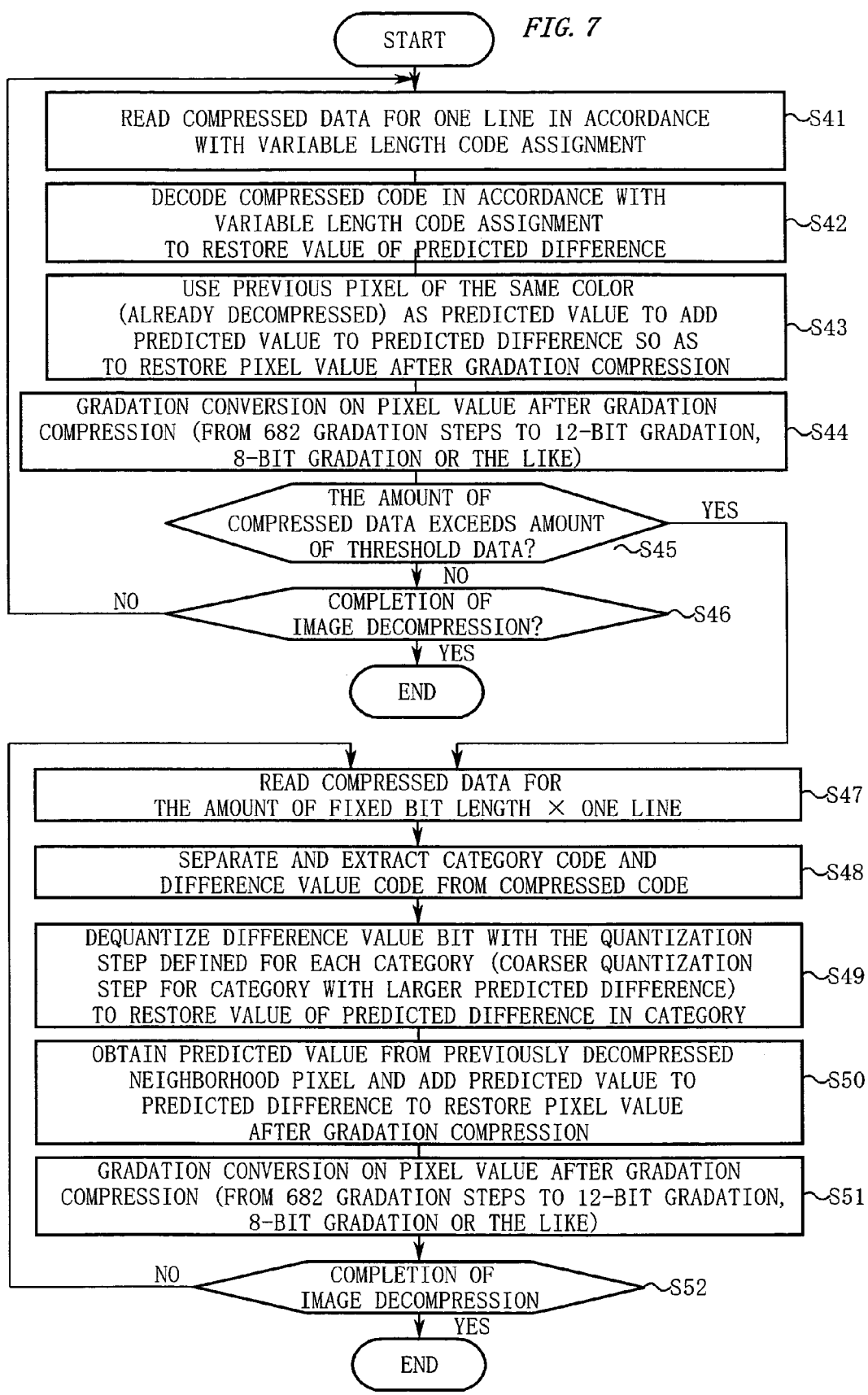

FIG. 8

REQUANTIZATION OF FIXED BIT LENGTH OF 7 BITS

| PREDICTED DIFFERENCE S | CATEGORY NUMBER | BIT LENGTH OF CATEGORY CODE | QUANTIZATION STEP | BIT LENGTH OF DIFFERENCE VALUE CODE | BIT LENGTH OF PREDICTED DIFFERENCE FOR EACH PIXEL | QUANTIZATION ERROR |
|---|---|---|---|---|---|---|
| 0 | No. 0 | 7bit | 1 | 0bit | 7bit | 1 |
| -1, 1 | No. 1 | 6bit | 1 | 1bit | 7bit | 1 |
| -3, -2, 2, 3 | No. 2 | 5bit | 1 | 2bit | 7bit | 1 |
| -7‥-4, 4‥7 | No. 3 | 4bit | 1 | 3bit | 7bit | 1 |
| -15‥-8, 8‥15 | No. 4 | 3bit | 1 | 4bit | 7bit | 1 |
| -31‥-16, 16‥31 | No. 5 | 3bit | 2 | 4bit | 7bit | 30 |
| -63‥-32, 32‥63 | No. 6 | 3bit | 4 | 4bit | 7bit | 60 |
| -127‥-64, 64‥127 | No. 7 | 3bit | 8 | 4bit | 7bit | 120 |
| -255‥-128, 128‥255 | No. 8 | 3bit | 16 | 4bit | 7bit | 240 |
| -511‥-256, 256‥511 | No. 9 | 3bit | 32 | 4bit | 7bit | 480 |
| -682‥-512, 512‥682 | No. 10 | 3bit | 64 | 4bit | 7bit | 960 |

FIG. 9

REQUANTIZATION OF FIXED BIT LENGTH OF 6 BITS

| PREDICTED DIFFERENCE S | CATEGORY NUMBER | BIT LENGTH OF CATEGORY CODE | QUANTIZATION STEP | BIT LENGTH OF DIFFERENCE VALUE CODE | BIT LENGTH OF PREDICTED DIFFERENCE FOR EACH PIXEL | QUANTIZATION ERROR |
|---|---|---|---|---|---|---|
| 0 | No. 0 | 6bit | 1 | 0bit | 6bit | 1 |
| -1, 1 | No. 1 | 5bit | 1 | 1bit | 6bit | 1 |
| -3, -2, 2, 3 | No. 2 | 4bit | 1 | 2bit | 6bit | 1 |
| -7··-4, 4··7 | No. 3 | 3bit | 1 | 3bit | 6bit | 1 |
| -15··-8, 8··15 | No. 4 | 3bit | 2 | 3bit | 6bit | 30 |
| -31··-16, 16··31 | No. 5 | 3bit | 4 | 3bit | 6bit | 60 |
| -63··-32, 32··63 | No. 6 | 3bit | 8 | 3bit | 6bit | 120 |
| -127··-64, 64··127 | No. 7 | 3bit | 16 | 3bit | 6bit | 240 |
| -255··-128, 128··255 | No. 8 | 3bit | 32 | 3bit | 6bit | 480 |
| -511··-256, 256··511 | No. 9 | 4bit | 128 | 2bit | 6bit | 1920 |
| -682··-512, 512··682 | No. 10 | 4bit | 256 | 2bit | 6bit | 1920 |

IMAGE COMPRESSOR FOR GENERATING PREDICTED DIFFERENCE CODE HAVING FIXED BIT LENGTH BY REQUANTIZING WITH COARSER QUANTIZATION STEPS

CROSS REFERENCE TO RELATED APPLICATION

The disclosure of the following priority application is herein incorporated by reference: Japanese Patent Application No. 2003-430926, filed on Dec. 25, 2003.

BACKGROUND OF THE INVENTION

1. Field of the Invention

The present invention relates to an image compressor for generating compressed data after adjusting a bit length of a predicted difference for one pixel to a fixed bit length and to an image compression program.

The present invention also relates to an image decompressor for decompressing the compressed data and an image decompression program.

The present invention further relates to an electronic camera including the image compressor described above.

2. Description of the Related Art

Background Technique of an Electronic Camera

An electronic camera for storing raw data, which is obtained by continuous shooting, in a buffer memory without compression is known as a conventional electronic camera. The buffer memory eliminates the necessity of conducting image processing or record processing in real time, enabling the reduction of time between continuous shots of the electronic camera.

However, when the buffer memory is full of the raw data during such continuous shooting, the operation of continuous shooting becomes remarkably slow. As a result, the number of frames, which can be taken by continuous shots at short intervals (hereinafter, referred to as "the number of frames taken by high-speed continuous shooting", has its limit.

In order to increase the number of frames taken by high-speed continuous shooting, it is normally necessary to increase the number of frames of raw data storable in the buffer memory.

Background Technique Related to Image Compression and Decompression

As a general data compression technique for raw data, a technique of performing variable length encoding on a predicted difference of raw data is known (the paragraph [0003] of Japanese Unexamined Patent Application Publication No. 2003-224868 and the like).

An electronic camera for recording uncompressed raw data in a buffer memory is known as a conventional electronic camera. The amount of uncompressed raw data is always constant. As a result, the above-described number of frames taken by high-speed continuous shooting becomes correspondingly always constant.

However, since the uncompressed raw data is quantized to have multiple gradation steps (for example, 12-bit quantization), the amount of data for each frame is large.

Accordingly, it is difficult to increase the number of frames taken by high-speed continuous shooting only if the uncompressed raw data is temporarily stored in the buffer memory.

In order to solve such a problem, a method of storing raw data in a buffer memory after image compression is conceived. For such image compression of the raw data, a conventional compression technique based on the variable length encoding described above can be used.

However, according to the variable length encoding, the amount of data after compression is not necessarily constant. In particular, when the assignment of variable length codes is not appropriate for the raw data, the amount of data after compression becomes unexpectedly large in some cases. In such a case, high-speed continuous shooting is interrupted at the early point of time. As a result, a disadvantage that a user misses the right moment to release the shutter, which is precious for the user, may arise.

In this manner, it was impossible to certainly ensure the minimum number of frames taken by high-speed continuous shooting if the raw data is variable-length encoded.

Consequently, the inventor of the invention studied a fixed bit length-based compression technique for fixing a bit length for each pixel.

In fixed bit length-based encoding, however, it is difficult to sufficiently increase the compression efficiency because a bit length for each pixel is fixed. If the compression efficiency is forced to be increased, there arises a fundamental problem that the degradation in image quality is increased along with the compression.

SUMMARY OF THE INVENTION

Therefore, in view of the above-described problems, the present invention has an object of providing a fixed bit length-based image compression technique with reduced degradation in image quality.

Hereinafter, the present invention will be described.

(1) An image compressor of the present invention includes a difference calculating unit and a difference requantizing unit.

The difference calculating unit calculates a predicted difference between a pixel value of image data and a predicted value (a calculated value of the pixel value predicted from known data).

The difference requantizing unit applies coarser quantization steps to requantize the predicted difference when the magnitude of the predicted difference exceeds a predetermined threshold value. As a result, the difference requantizing unit keeps a bit range of the predicted difference to predetermined size so as to generate compressed data in which a bit length of the predicted difference for one pixel is adjusted to a fixed bit length.

Description

With the above-described structure, when the magnitude of the predicted difference of the image data exceeds the threshold value, coarser quantization steps are applied in the present invention. As a result of such an operation, the value of the predicted difference can be kept small so as to limit the bit range to predetermined size.

As a result, the bit length of the predicted difference for one pixel is uniformly set to a relatively small fixed bit length, enabling the compression of the amount of data of the entire image.

Since the pixel value and the predicted value are normally close to each other, most of predicted differences have values close to 0. Therefore, since the quantization steps are not coarse for the most of predicted differences, the degradation in image quality due to a quantization error scarcely occurs.

For the remaining area, since the quantization steps become coarse, a quantization error is generated. However, since such an area is small, the degradation in image quality due to the quantization error is limited to only a part of the entire image and therefore is hardly visible when the entire image is viewed.

Furthermore, in many cases, a signal level of an image greatly changes at the position where such a quantization error is generated. Therefore, the quantization error is superposed on a great change of the signal level, so that the quantization error is hardly perceivable by human eyes.

Since such effects can be obtained synergistically, the image compression based on the fixed bit length method with reduced degradation in image quality can be realized in the present invention.

(2) Preferably, the difference requantizing unit applies the coarser quantization steps as the predicted difference becomes larger (for example, as the predicted difference becomes larger, coarser quantization steps are applied in a stepwise manner or a continuous manner) to assimilate to visual characteristics of human eyes that a precise signal level is less likely to be perceived at a position where a predicted difference is large.

By such requantization, the difference requantizing unit sets a bit length of the predicted difference for one pixel to a fixed bit length.

(3) More preferably, the image compressor further includes a gradation compression unit. The gradation compression unit performs gradation compression on the pixel value of the image data to reduce the number of gradation steps. On the other hand, the difference calculating unit calculates the predicted difference for the pixel value which has been subjected to the gradation compression by the gradation compression unit. In this manner, a bit length of the predicted difference for one pixel is adjusted to a fixed bit length through at least two steps, i.e., "gradation compression of the pixel value" and "requantization of the predicted difference". As a result, the degradation in image quality can be restrained as compared with the case where only one of the steps is carried out.

(4) More preferably, the image compressor further includes a variable length encoding unit and a compression control unit. The variable length encoding unit performs variable length encoding on the predicted difference calculated by the difference calculating unit in accordance with a predefined assignment rule of variable length codes. On the other hand, the compression control unit uses the variable length encoding unit to execute image compression of the image data so as to monitor a shift of the amount of compressed data. At this time, if it is determined that the amount of compressed data exceeds a predefined threshold amount of data, the compression control unit switches the image compression method to the image compression based on the fixed bit length method using the difference requantizing unit.

The image compressor of the present invention is characterized by switching of the compression method by the compression control unit during the compression as described above to prevent the amount of compressed data of the image data from exceeding a predetermined margin amount of data.

(5) An electronic camera of the present invention includes an image compressor, an imaging unit, and a buffer memory.

The image compressor is the image compressor cited in the (1) above. The imaging unit has a function of continuously shooting a subject to sequentially output raw data. The buffer memory temporarily stores the data.

The image compressor generates compressed data whose upper limit amount is limited from the raw data sequentially output from the imaging unit, to sequentially store the compressed data in the buffer memory. By such an image compression operation, the minimum number of frames taken by continuous shooting, which can be stored in the buffer memory, is ensured.

(6) An image decompressor of the present invention is for decompressing the compressed data generated by the image compressor cited in the (1) above, and includes a difference dequantizing unit and an addition operation unit.

The difference dequantizing unit extracts a predicted difference after quantization for each fixed bit length from the compressed data and dequantizes the predicted difference in accordance with the quantization steps used in image compression to restore a value of the predicted difference.

The addition operation unit adds the predicted value to the predicted difference obtained by the difference dequantizing unit to generate image data.

(7) Another image decompressor of the present invention is for decompressing the compressed data generated by the image compressor cited in the (4) above, and includes a variable length decoding unit, a difference dequantizing unit, a decompression control unit, and an addition operation unit.

The variable length decoding unit decodes a variable length code of the compressed data in accordance with the assignment rule of the variable length codes to restore a predicted difference.

The difference dequantizing unit extracts a predicted difference after quantization for each fixed bit length from the compressed data and dequantizes the predicted difference in accordance with the quantization steps used in compression to restore a value of the predicted difference.

The decompression control unit uses the variable length encoding unit to restore the predicted difference from the compressed data. If the amount of compressed data exceeds the threshold amount of data, the decompression control unit uses the difference dequantizing unit to restore the predicted difference from the compressed data.

The addition operation unit adds the predicted value to the predicted difference obtained by the decompression control unit to generate image data.

(8) An image compression program of the present invention is for allowing a computer to function as the difference calculating unit and the difference requantizing unit cited in the above (1).

(9) An image decompression program of the present invention is for allowing a computer to function as the difference dequantizing unit and the addition operation unit cited in the above (6).

(10) An image decompression program of the present invention is for allowing a computer to function as the variable length decoding unit, the difference dequantizing unit, the decompression control unit, and the addition operation unit cited in the above (7).

BRIEF DESCRIPTION OF THE DRAWINGS

The nature, principle, and utility of the invention will become more apparent from the following detailed description when read in conjunction with the accompanying drawings in which like parts are designated by identical reference numbers, in which:

FIG. 4 is a view showing an example of a requantization table;

FIG. 6 is a flowchart illustrating a compression operation based on a switchable method;

FIG. 7 is a flowchart illustrating a decompression operation based on the switchable method;

FIG. 8 is a view showing another example of the requantization table;

FIG. 9 is a view showing a further example of the requantization table; and

DETAILED DESCRIPTION OF THE PREFERRED EMBODIMENT

Hereinafter, an embodiment of the present invention will be described in detail with reference to the accompanying drawings.

Description of the Entire Configuration of an Electronic Camera

Figure 1:
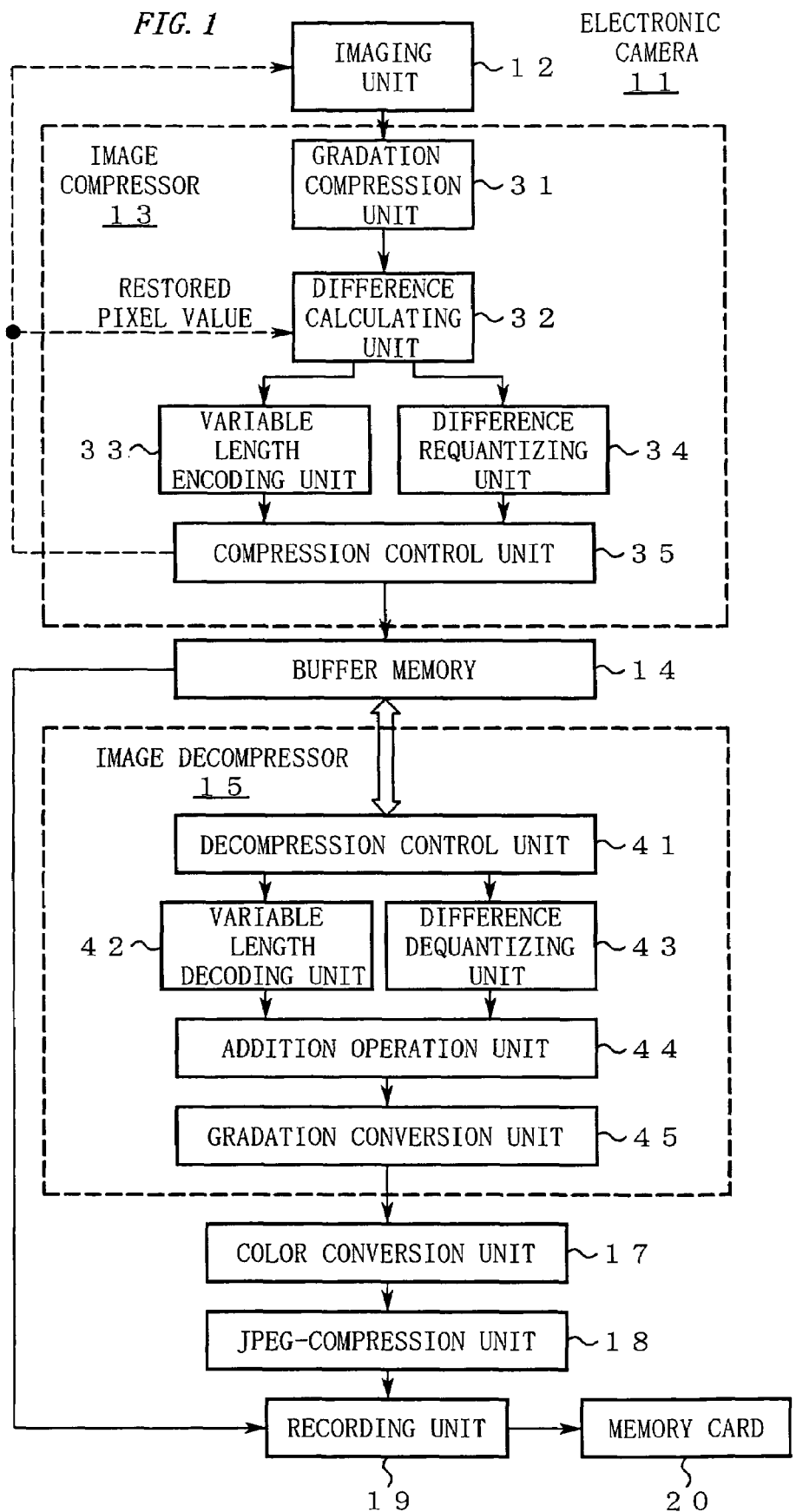
FIG. 1 is a view showing a structure of an electronic camera 11 according to an embodiment of the present invention.

FIG. 1 shows a structure of an electronic camera 11 according to this embodiment.

In FIG. 1, the electronic camera 11 includes an imaging unit 12. The imaging unit 12 has a normal shooting function as well as a function of continuously shooting a subject to sequentially output raw data. The thus sequentially output raw data is subjected to image compression in almost real time by an image compressor 13 so as to be sequentially stored in a buffer memory 14 as compressed data.

An image decompressor 15 reads out the compressed data from the buffer memory 14 at appropriate time for image decompression in accordance with the status of a recording unit 19 at a later stage so as to restore the raw data. The restored raw data passes through a color conversion unit 17, a JPEG-compression unit 18, and the like so as to be converted into a JPEG-compressed file. The JPEG-compressed file is recorded and stored in a memory card 20 by the recording unit 19.

Alternatively, the recording unit 19 may add a file header, a marker code, or the like to the compressed data stored in the buffer memory 14 so as to generate a compressed raw file for recording and storage in the memory card 20.

Description of a Configuration of the Image Compressor 13

In the structure as described above, the image compressor 13 has the following functional blocks.

(1) A gradation compression unit 31 performs gradation compression on the raw data for each pixel so as to reduce the number of gradation steps.

(2) A difference calculating unit 32 calculates a difference between a pixel value and its predicted value so as to obtain a predicted difference. It is preferred to calculate the predicted value from known data in the vicinity of the pixel value. For obtaining a simple predicted value, a neighborhood pixel value, which is calculated prior to the calculation of the pixel value in image decompression, may be used as the predicted value.

(3) A variable length encoding unit 33 is for variable length encoding of the predicted difference.

(4) A difference requantizing unit 34 classifies the predicted difference into one of a plurality of categories and requantizing the predicted difference in accordance with quantization steps for each category. The requantization reduces a bit range of the predicted difference so as to uniformize a bit length of the predicted difference after the requantization (that is, a compressed code) to a small fixed bit length.

(5) A compression control unit 35 has a monitoring function of the amount of produced compressed data and a function of controlling the switching of operations of the variable length encoding unit 33 and the difference requantizing unit 34.

Description of a Configuration of the Image Decompressor 15

On the other hand, the image decompressor 15 includes the following functional blocks.

[1] A decompression control unit 41 has a monitoring function of the amount of process of the compressed data and a function of controlling the switching of operations of a variable length decoding unit 42 and a difference dequantizing unit 43.

[2] The variable length decoding unit 42 extracts a variable length code from the compressed data so as to decode it, thereby restoring a predicted difference.

[3] The difference dequantizing unit 43 extracts the compressed code having a fixed bit length from the compressed data so as to perform dequantization in accordance with the quantization steps used by the difference requantizing unit 34, thereby restoring a predicted difference.

[4] An addition operation unit 44 adds a predicted value produced from the decompressed known data to the restored predicted difference so as to restore a pixel value of the raw data.

Description of the Compression Operation Based on a Fixed Bit Length Method

A user can use custom setting (the function which allows the user to preset the operations of a camera) of the electronic camera 11 so as to appropriately select a compression mode of the raw data.

Figure 2:
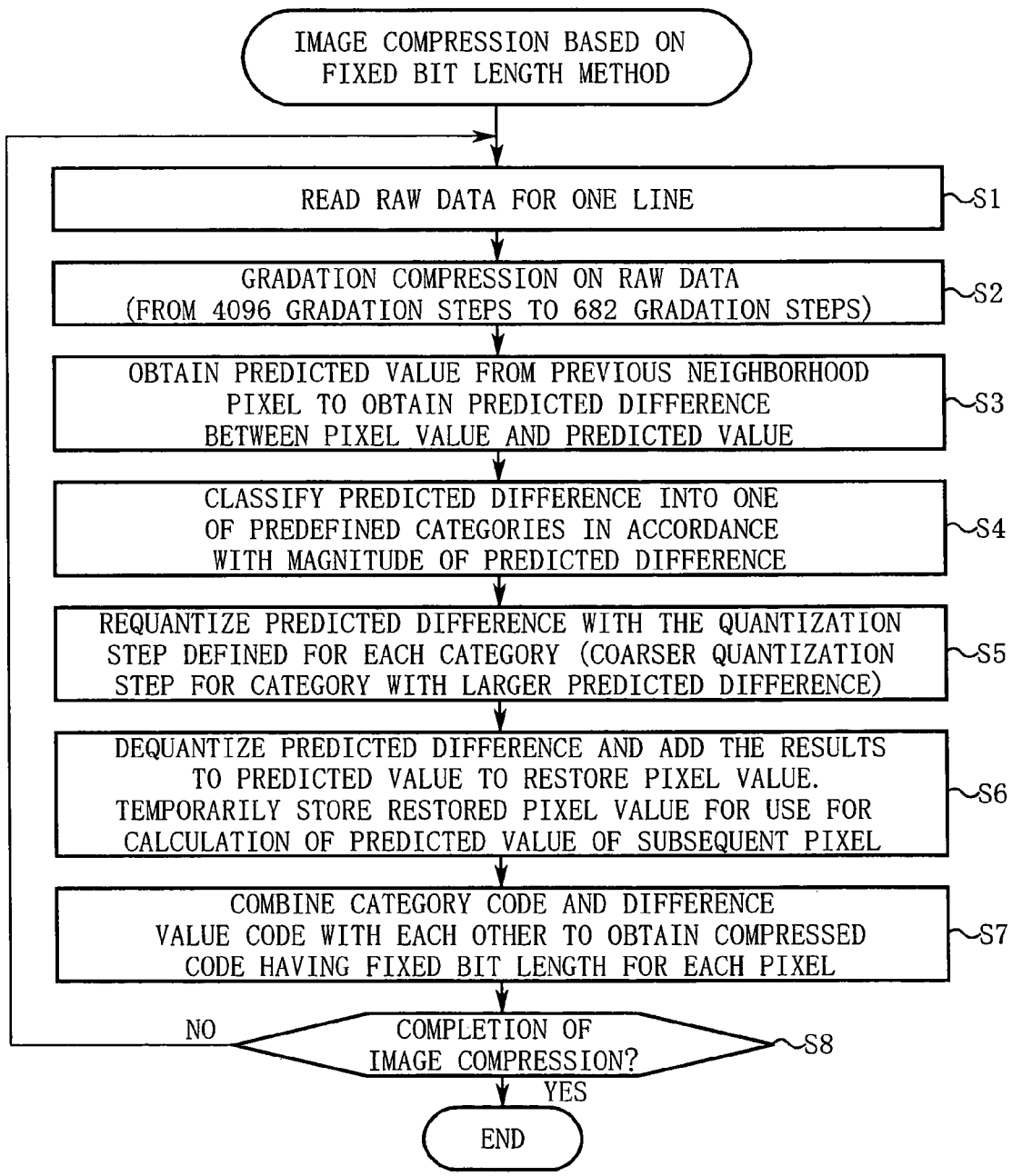
FIG. 2 is a flowchart illustrating a compression operation based on a fixed bit length method.

FIG. 2 is a flowchart showing an operation procedure of raw data compression based on a fixed bit length method, which corresponds to one of the compression methods. Hereinafter, in accordance with the step numbers shown in FIG. 2, the compression processing based on the fixed bit length method will be described.

[Step S1] The imaging unit 12 outputs raw data which is linearly quantized to 12 bits. The image compressor 13 reads the raw data per line.

Figure 3:
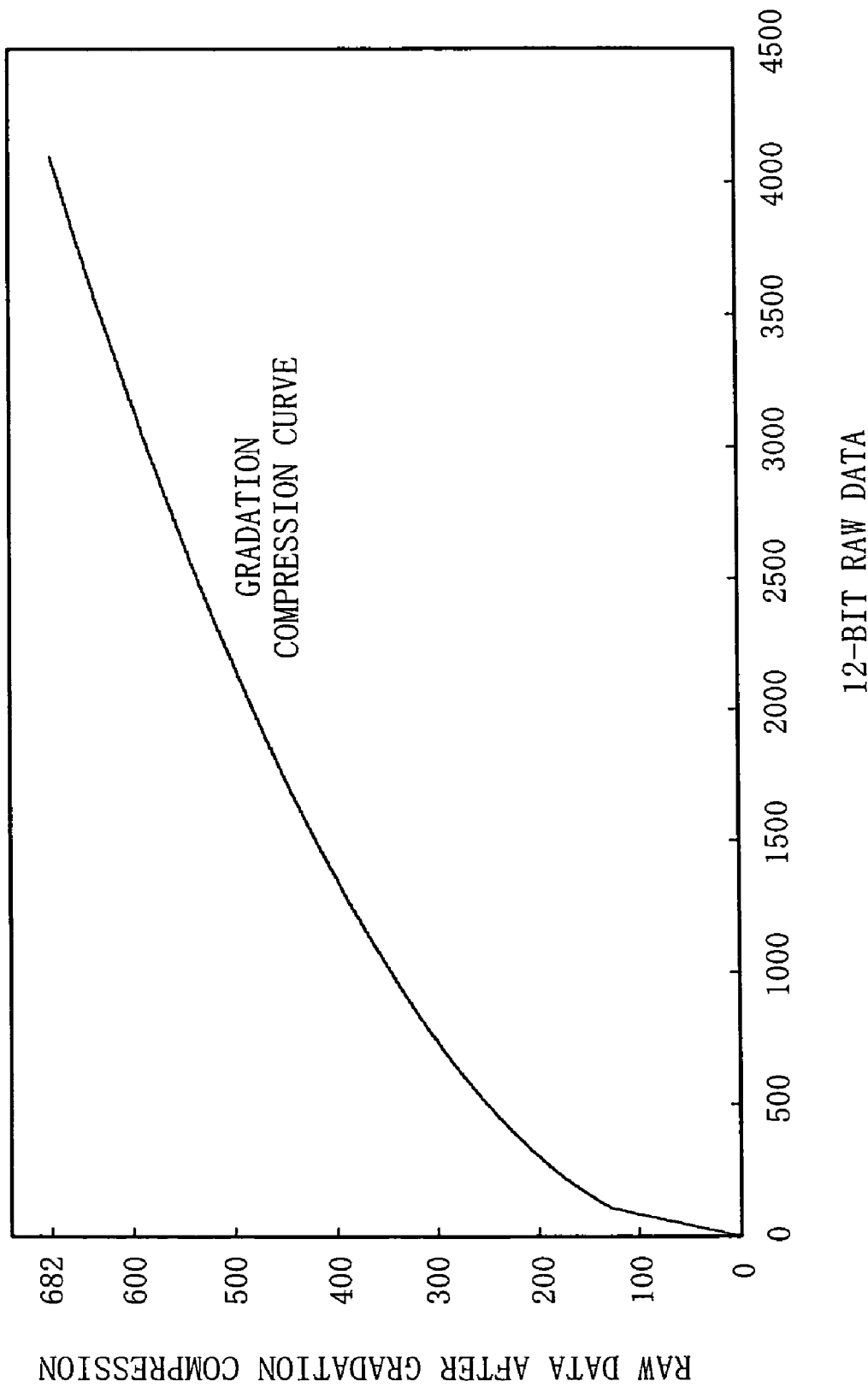
FIG. 3 is a view showing an example of a gradation compression curve.

[Step S2] The gradation compression unit 31 performs gradation compression having a characteristic shown in FIG. 3 on the read raw data per pixel. The gradation compression successfully reduces 4096 gradation steps of the raw data to 682 gradation steps.

In particular, since the gradation compression is mainly performed on the gradation band where human visual sensitivity is low, the degradation in image quality is remarkably low.

Moreover, in this gradation compression, linear gradation conversion is performed in the gradation band on the dark area side. Therefore, an unnatural tone jump does not occur on the dark area side. As a result, the gradation of shade and shadow, hair or the like can be successfully reproduced in a natural and colorful way. Furthermore, the intensity of gradation compression is gradually increased in the gradation band from the middle area to the bright area side. As a result, the average amplitude of a level-dependent noise (for example, a shot noise) contained within the gradation band can be successfully almost equalized.

[Step 3] Based on a previously compressed pixel of the same color (in the case of raw data in Bayer arrangement, the second pixel on the left), a predicted value of a pixel to be processed is obtained. If the difference calculating unit 32 determines that the surroundings of the pixel to be processed have a low color saturation, a pixel, from which the predicted value of the pixel to be processed is obtained, is not limited to that of the same color; the predicted value of the pixel to be processed may be calculated based on a preceding pixel of a different color.

For such a prediction calculation, the closest value of the preceding pixel values may be used as the predicted value. Alternatively, the predicted value may be calculated by an interpolation calculation of a plurality of pixels in the vicinity or an extension calculation.

Furthermore, the predicted value may be calculated from a neighborhood pixel value, which is obtained by decompressing the compressed data of a neighborhood pixel so as to set the same calculation conditions as those for a predicted value in image decompression. This embodiment uses the latter method. Thus, a restored pixel value, which is previously obtained in compression processing (corresponding to step S6 described below) of a preceding pixel, is used so as to obtain a predicted value. In this embodiment, harmful effects that errors are accumulated during image decompression are prevented by the use of such a predicted value.

The difference calculating unit 32 subtracts the above predicted value from the pixel value of the pixel to be processed to obtain a predicted difference S.

For the first pixel or pixels at periodic positions, it is preferred that not the predicted difference but the pixel value be included in a compressed code.

[Step S4] The difference requantizing unit 34 determines a magnitude |S| of the above predicted difference in accordance with threshold values based on a requantization table shown in FIG. 4. In this way, the difference requantizing unit 34 classifies the predicted difference into one of eleven-level categories.

[Step S5] Subsequently, the difference requantizing unit 34 requantizes the predicted difference with the spacing of quantization steps predefined for each category.

It is preferred that the visual sensitivity of human eyes at the position with a large predicted difference is obtained in advance by a subjective test of image quality so as to preset the quantization steps assimilated to the allowable range of the visual sensitivity.

By increasing the quantization steps in a stepwise manner (and in a continuous manner if the spacing of steps is further increased), the bit range of a difference value code corresponding to the results of requantization is kept to about 5 to 6 bits. The difference value code serves as lower-order bits of the compressed code.

Figure 10:
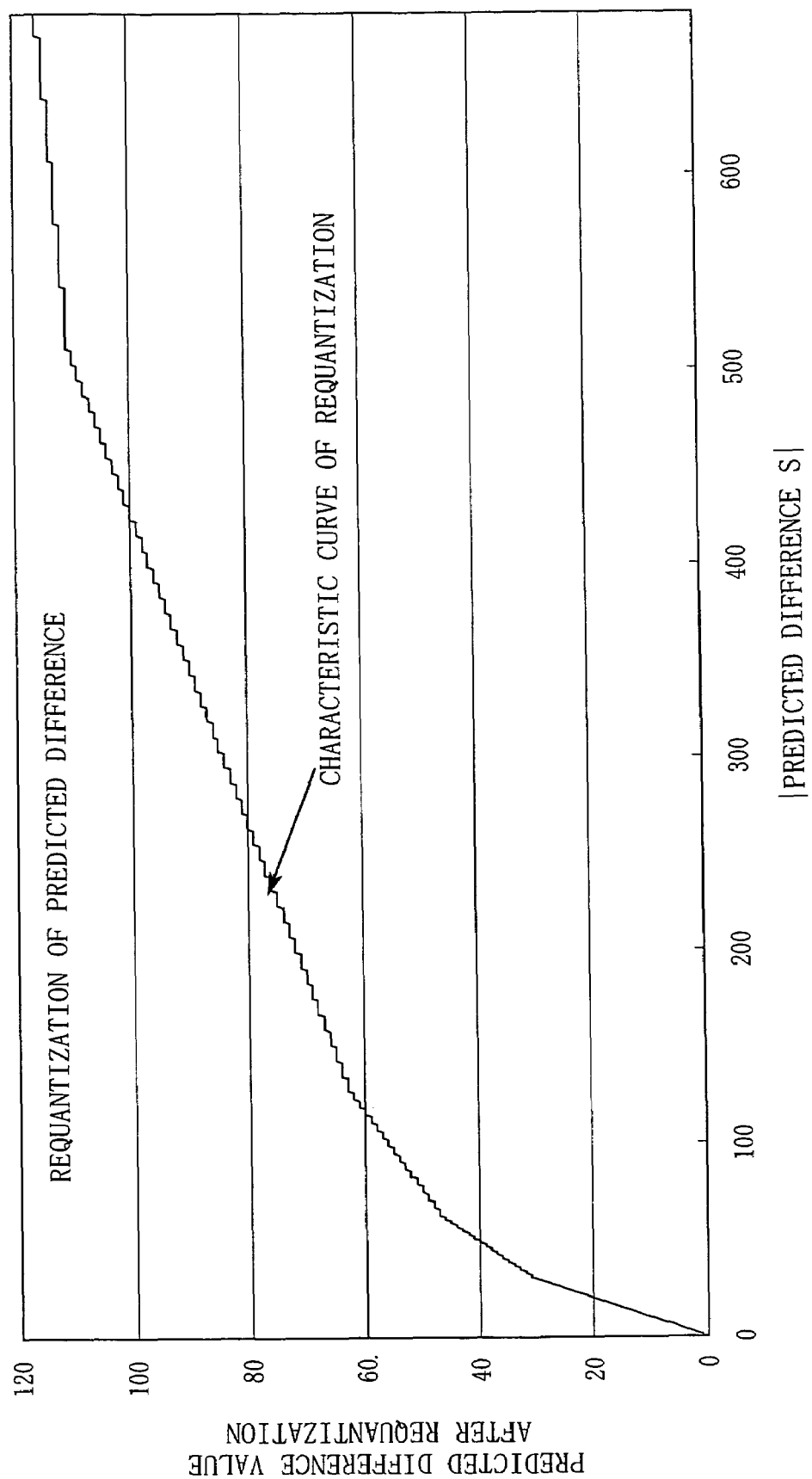
FIG. 10 is a view showing an example of a characteristic curve of requantization.

FIG. 10 shows the requantization characteristic shown in FIG. 4 as a characteristic curve.

[Step S6] At this step, the compression control unit 35 dequantizes the predicted difference after the requantization. Then, the predicted value is added to the results of dequantization so as to restore a pixel value for a moment. The thus restored pixel value is temporarily stored in the difference calculating unit 32 so as to be used for calculation of a predicted value of a subsequent pixel.

A quantization error value shown in FIG. 4 is obtained by calculating back the maximum error value possibly contained in the restored pixel value with the gradation conversion curve shown in FIG. 3 and then indicating the results as a value within the full range of 4096 gradation steps.

[Step S7] Next, the difference requantizing unit 34 generates a category code so that the category, into which the predicted difference is classified, can be identified. The category code corresponds to higher-order bits of the compressed code.

A variable length code is pre-assigned to the category code so that the category code gives a fixed bit length (in this case, 8 bits) in combination with a bit length of the difference value code.

By combining the category code and the difference value code with each other as the higher-order bits and the lower-order bits, a compressed code having a fixed bit length is generated. The thus generated compressed codes are successively written to the buffer memory 14 by the compression control unit 35.

[Step S8] The compression control unit 35 returns to step S1 so as to continue the image compression based on the fixed bit length method until the image compression of the sequentially output raw data is completed.

The compression control unit 35 monitors an available space of the buffer memory 14. If the available memory space is not enough for the amount of the compressed data for a next frame (≈fixed bit length×the number of pixels), the continuous shooting of the imaging unit 12 may be interrupted.

By the above operation, the image compressor 13 can generate the compressed data having a fixed bit length for one pixel in almost real time from the raw data sequentially output from the imaging unit 12.

Description of a Decompression Operation Based on the Fixed Bit Length Method

Figure 5:
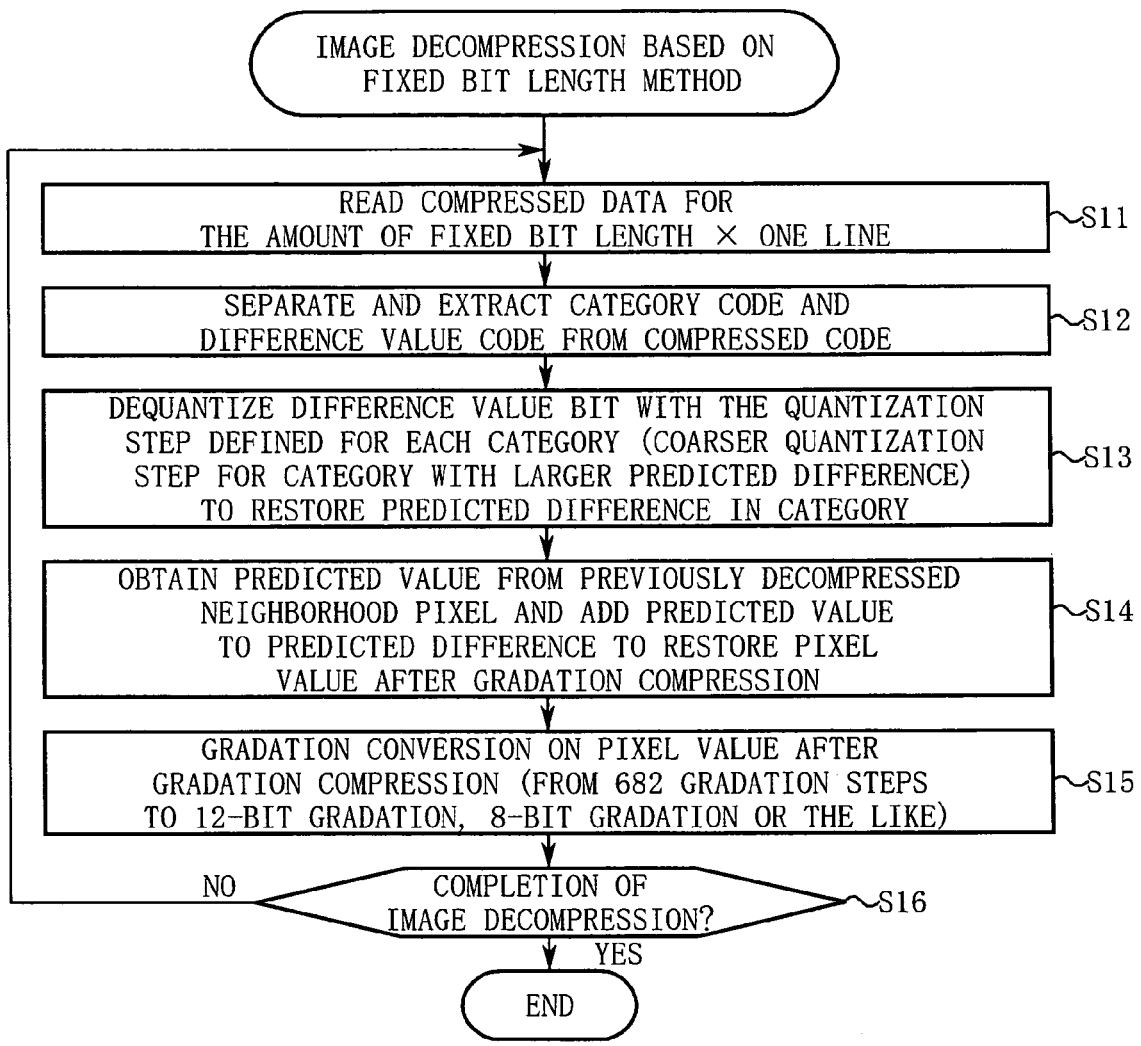
FIG. 5 is a flowchart illustrating a decompression operation based on the fixed bit length method.

FIG. 5 is a flowchart for illustrating a decompression operation based on the fixed bit length method. Hereinafter, the decompression operation based on the fixed bit length method will be described in accordance with the step numbers shown in FIG. 5.

[Step S11] The decompression control unit 41 reads out compressed data for one line (≈fixed bit length×the number of pixels for one line) from the buffer memory 14 in accordance with the status of the recording unit 19 at the later stage.

[Step S12] The difference dequantizing unit 43 separates the compressed code in the compressed data into higher-order bits and lower-order bits in accordance with the assignment rule of variable codes to the category codes so as to obtain the category code and the difference value code.

[Step S13] The difference dequantizing unit 43 uses the quantization steps of the category indicated by the category code so as to dequantize the difference value bit, thereby restoring a value of the predicted difference in the category.

[Step S14] The addition operation unit 44 calculates a predicted value of the pixel to be processed (which is the same as the predicted value used in compression or its approximate) based on a neighborhood pixel value which is previously decompressed.

The addition operation unit 44 adds the restored predicted difference to the calculated predicted value so as to restore a pixel value which is already subjected to gradation compression.

[Step S15] The gradation conversion unit 45 performs the gradation conversion on the restored pixel value. For example, if 12-bit raw data is required in image processing at the later stage, the gradation conversion for distributing 682 gradation steps to 12-bit gradation is conducted. If 8-bit gradation is sufficient for the image processing at the later stage, the gradation conversion for distributing 682 gradation steps to 8-bit gradation is conducted.

[Step S16] The decompression control unit 41 returns to step S11 so as to continue the image decompression operation until the buffer memory 14 no longer stores the compressed data.

When no compressed data is stored in the buffer memory 14 by repeating the above operation, the decompression control unit 41 terminates the image decompression operation.

By the above operation, the image decompressor 15 performs the image decompression on the compressed data crammed into the buffer memory 14 at appropriate time so as to provide the decompressed data for the image processing at the later stage without delay.

Description of a Compression Operation Based on a Switchable Method

Next, a method for allowing the variable length encoding method and the fixed bit length method to be switched during the compression or decompression (referred to as a "switchable method") will be described.

FIG. 6 is a flowchart illustrating a compression operation based on the switchable method.

[Steps S21 to S23] The same operations as those at the above-described steps S1 to S3 are performed.

[Step S24] The variable length encoding unit 33 encodes a predicted difference obtained at step S23 in accordance with the predefined assignment rule of variable codes so as to generate a compressed code having a variable length.

The thus generated compressed codes are successively written to the buffer memory 14 by the compression control unit 35.

[Step S25] The compression control unit 35 accumulates the bit lengths of the compressed codes having variable lengths so as to obtain a total amount of compressed data at present time. Next, the compression control unit 35 estimates whether the amount of compressed data exceeds a threshold amount of data or not based on the amount of compressed data at present time. In this case, it may be estimated whether the amount of compressed data exceeds the threshold amount of data or not based on the size of a compression bit rate calculated by average calculation from the amount of compressed data at present time. Alternatively, for example, the amount of compressed data at present time may be determined in accordance with threshold values so as to estimate whether the amount of compressed data exceeds the threshold amount of data or not.

If it is determined that the amount of compressed data exceeds the threshold amount of data, the compression control unit 35 transits to step S27 for a subsequent operation (although the determination of switching of the compression methods is performed in line units in this case, the determination of switching of the compression methods may be performed in pixel units).

On the other hand, if it is determined that the amount of compressed data does not exceed the threshold amount of data, the compression control unit 35 transits to step S26 for a subsequent operation.

[Step S26] The compression control unit 35 returns to step S21 to continue the image compression based on the variable length encoding method until the image compression of raw data is completed.

[Steps S27 to S34] Since these steps are the same as the above-described steps S1 to S8, the detailed description thereof is herein omitted. The transition of the operation to step S27 switches the compression method of the raw data from the variable length encoding method to the fixed bit length method.

Description of a Decompression Operation Based on the Switchable Method

Next, a decompression operation based on the switchable method shown in FIG. 7 will be described.

[Step S41] The decompression control unit 41 reads out the compressed data for one line from the buffer memory 14 in accordance with the status of the recording unit 19 at the later stage. Since the compressed data read out at this time is a variable length code, the compressed data for one line is read out while a compressed code string is divided in accordance with the assignment rule of the variable length codes, which is used in compression.

[Step S42] The variable length decoding unit 42 decodes the compressed code in accordance with the assignment rule of the variable length codes so as to restore a value of the predicted difference.

[Step S43] The addition operation unit 44 calculates a predicted value of a pixel to be processed based on a neighborhood pixel value which is previously decompressed.

The addition operation unit 44 adds the restored predicted difference to the calculated predicted value to restore a pixel value after the gradation compression.

[Step S44] The gradation conversion unit 45 performs the gradation conversion on the restored pixel value.

[Step S45] The decompression control unit 41 monitors the amount of compressed data read out from the buffer memory 14. The decompression control unit 41 estimates whether the amount of compressed data exceeds the threshold amount of data or not based on the amount of compressed data at present time.

If it is determined that the amount of compressed data exceeds the threshold amount of data, the decompression control unit 41 transits to step S47 for a subsequent operation. (In this case, the determination of switching of the decompression methods is performed in line units. However, if the determination of switching of the compression methods is performed in pixel units in compression, the determination of switching of the decompression methods may also be performed in pixel units.)

On the other hand, if it is determined that the amount of compressed data does not exceed the threshold amount of data, the compression control unit 35 transits to step S46 for a subsequent operation.

[Step S46] The decompression control unit 41 returns to step S41 to repeat the image decompression until the compressed data is no longer stored in the buffer memory 14.

On the other hand, the decompression control unit 41 terminates the decompression operation when no compressed data is stored in the buffer memory 14.

[Steps S47 to S52] Since these steps are the same as the above-described steps S11 to S16, the detailed description thereof is herein omitted. The transition of the operation to step S47 switches the decompression method of raw data from the variable length encoding method to the fixed bit length method.

The above operation allows the point of switching the compression method to be detected at step S45 so as to successfully switch the decompression method in an appropriate manner.

Effects of the Present Embodiment

As described above, in this embodiment, as the magnitude |S| of the predicted difference increases, the quantization steps become coarse. Such an operation allows the bit range of the predicted difference to be kept moderate so as to uniformize the bit lengths of the compressed codes of the predicted differences to a relatively small fixed bit length.

By uniformizing the bit lengths of the compressed codes to the fixed bit length in this manner, the amount of compressed data is restrained from unexpectedly increasing as in the variable length encoding method. As a result, it is ensured that a large amount of compressed raw data can be stored in the buffer memory 14 to permit an ensured increase in the number of frames taken by high-speed continuous shooting.

Furthermore, by uniformizing the bit lengths of the compressed codes to the fixed bit length in this manner, the address management of the compressed data in the buffer memory 14 is remarkably facilitated. For example, the address management is remarkably facilitated when a partial image is read out from the compressed data in the buffer memory 14. In this case, electronic zoom or trimming on the compressed data in the buffer memory 14 can be facilitated at an increased speed.

Moreover, since the compressed code has a fixed bit length, the address management is also remarkably facilitated when the compressed data in the buffer memory 14 is thinned out or averaged to reduce the number of pixels. Therefore, the processing of reducing the number of pixels of the compressed data in the buffer memory 14 to generate an image of reduced size for a quick view or the like can be facilitated at an increased speed.

Furthermore, the image compressor 13 and the image decompressor 15 may uniformly treat the compressed codes having a relatively small fixed bit length. Therefore, the processing in the image compressor 13 and the image decompressor 15 is easily pipelined so as to remarkably increase the speed of the image compression and the image decompression.

In addition, the hardware configurations of the image compressor 13 and the image decompressor 15 can be efficiently simplified because operation registers included therein have to process only the fixed bit length.

As described above, the raw data is made to have a fixed bit length so as to be stored in the buffer memory 14, so that various buffer memory-related functions, which are difficult to realize by the raw data compression based on variable length encoding, can be easily realized. As a result, the possibility of providing the multifunctionality to the electronic camera 111 or the like can be widely increased.

Furthermore, the fixed bit length method has an advantage in high image-quality compression, which is regarded as particularly important in compression of raw data.

Specifically, since the values of predicted differences generally concentrate in the vicinity of 0, the quantization steps do not become coarse for most of the predicted differences. Therefore, a quantization error is negligible. Furthermore, at the position with a large predicted difference, there is a high possibility that the pixel value greatly changes. At such a position, even if the quantization error is superposed thereon, such an error is hardly visible because it is hidden behind a large change of the pixel value.

Moreover, in this embodiment, the compressed code is generated through two steps of "gradation compression of a pixel value" and "requantization of a predicted difference". Therefore, in this two-step method, the degradation in image quality hardly occurs as compared with the case where a bit length is compressed only by any one of the steps. Furthermore, since how the degradation in image quality appears differs between the processes at the two steps, the effects of dispersing the degradation in image quality are also produced. Owing to such effects, the degradation in image quality becomes further invisible.

On the other hand, in the compression based on the switchable method shown in FIG. 6, the variable length encoding is first executed. If the amount of compressed data is unexpectedly increased, the compression method is switched to the fixed bit length method in the middle of the process. In this case, since the compression bit rate is fixed in the fixed bit length method, the amount of compressed data is prevented from excessively increasing. As a result, the final amount of compressed data can be kept to or below a predetermined margin amount of data.

As a result, it is possible to ensure the minimum number of frames taken by continuous shooting, which can be stored in the buffer memory 14. Accordingly, the electronic camera 11 capable of ensuring the minimum number of frames taken by high-speed continuous shooting can be realized.

Supplementary Items of this Embodiment

Although the case where each of the image compressor 13 and the image decompressor 15 is realized with a hardware has been mainly described in the above embodiment, the present invention is not limited thereto. For example, the image compressor 13 or the image decompressor 15 may be realized by a software operation such as that of a microprocessor.

Alternatively, for example, an image compression program for making a computer to execute the operation shown in FIG. 2 or FIG. 6 may be created. By activating the image compression program on the computer, the computer can function as the image compressor of the present invention.

Furthermore, for example, an image decompression program for making a computer to execute the operation shown in FIG. 5 or FIG. 7 may be created. By activating the image decompression program on the computer, the computer can function as the image decompressor of the present invention.

Although the case where the image compression and the image decompression of raw data are performed has been described in the above embodiment, the present invention is not limited thereto. By using the compression and decompression techniques of the present invention, general image data can also be compressed and decompressed.

Although the case where the data is compressed to have a fixed bit length of 8 bits has been described in the above example, the present invention is not limited thereto. For example, by using requantization tables shown in FIGS. 8 and 9, the data can also be compressed to have a fixed bit length of 7 bits or 6 bits.

Furthermore, the requantization is performed after the classification of a predicted difference into one of the categories in the above embodiment. However, the requantization procedure of present invention is not limited to the above procedure. For example, a correlated table of codes obtained by combining category values with requantization values may be prepared in advance so as to directly obtain a value after requantization.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. An image compressor comprising:
    a difference calculating unit calculating a predicted difference between a pixel value of image data and a predicted value (a calculated value of said pixel value predicted from known data); and
    a difference requantizing unit applying coarser quantization steps to requantize said predicted difference when a magnitude of said predicted difference exceeds a predetermined threshold value, to keep a bit range of the predicted difference to a predetermined size and generate compressed data in which a bit length of said predicted difference for one pixel is adjusted to a fixed bit length.

2. The image compressor according to claim 1, wherein
said difference requantizing unit applies the coarser quantization steps in a stepwise manner or a continuous manner as the predicted difference becomes larger, to assimilate to visual characteristics of human eyes that a precise signal level is less likely to be perceived at a position where said predicted difference is large, thereby setting a bit length of said predicted difference for one pixel to the fixed bit length.

3. The image compressor according to claim 1, further comprising a gradation compression unit performing gradation compression on the pixel value of said image data to reduce the number of gradation steps, and wherein
said difference calculating unit calculates said predicted difference for said pixel value having been subjected to the gradation compression by said gradation compression unit, thereby adjusting a bit length of said predicted difference for one pixel to the fixed bit length through at least two steps of "gradation compression of said pixel value" and "requantization of said predicted difference" to restrain degradation in image quality as compared with a case where only one of the steps is carried out.

4. The image compressor according to claim 1, further comprising:
a variable length encoding unit performing variable length encoding on said predicted difference calculated by said difference calculating unit, in accordance with a predefined assignment rule of variable length codes; and
a compression control unit executing image compression of said image data by using said variable length encoding unit to monitor a shift of an amount of compressed data, and the compression control unit switching the image compression method to the image compression based on the fixed bit length method using said difference requantizing unit when it is determined that said amount of compressed data exceeds a predefined threshold amount of data, whereby
switching of the compression method by said compression control unit during the compression prevents the amount of compressed data of said image data from exceeding a predetermined margin amount of data.

5. An electronic camera comprising:
the image compressor according to claim 1;
an imaging unit having a function of continuously shooting a subject to sequentially output raw data; and
a buffer memory temporarily storing the data, wherein
the image compressor generates compressed data whose upper limit amount is limited from said raw data sequentially output from said imaging unit, to sequentially store the compressed data in said buffer memory, thereby ensuring the minimum number of frames taken by continuous shooting, which can be stored in said buffer memory.

6. An image decompressor decompressing compressed data generated by the image compressor according to claim 1, further comprising:
a difference dequantizing unit extracting a predicted difference after quantization for each fixed bit length from said compressed data and dequantizing the predicted difference in accordance with the quantization steps used in image compression to restore a value of said predicted difference; and
an addition operation unit adding said predicted value to said predicted difference obtained by said difference dequantizing unit to generate image data.

7. An image decompressor decompressing compressed data generated by the image compressor according to claim 4, further comprising:
a variable length decoding unit decoding a variable length code of said compressed data in accordance with the assignment rule of said variable length codes to restore said predicted difference;
a difference dequantizing unit extracting a predicted difference after quantization for each fixed bit length from said compressed data and dequantizing the predicted difference in accordance with the quantization steps used in image compression to restore a value of said predicted difference;
a decompression control unit restoring said predicted difference from said compressed data by using said variable length decoding unit, and restoring said predicted difference from said compressed data by using said difference dequantizing unit when said amount of compressed data exceeds said threshold amount of data; and
an addition operation unit adding said predicted value to said predicted difference obtained by said decompression control unit to generate image data.

8. A computer readable storage medium storing an image compression program capable of instructing a computer to function as said difference calculating unit and said difference requantizing unit according to claim 1.

9. A computer readable storage medium storing an image decompression program capable of instructing a computer to function as said difference dequantizing unit and said addition operation unit according to claim 6.

10. A computer readable storage medium storing an image decompression program capable of instructing a computer to function as said variable length decoding unit, said difference dequantizing unit, said decompression control unit, and said addition operation unit according to claim 7.

* * * * *